Nov. 16, 1971    R. L. CROWSON    3,620,093
SQUARE LINK CHAINS, AND THE MANUFACTURE THEREOF
Filed July 30, 1969
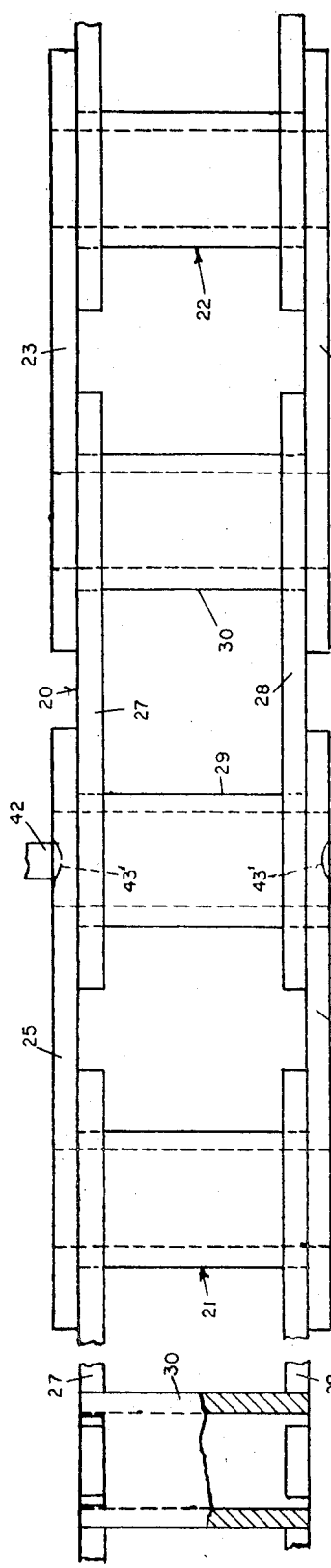
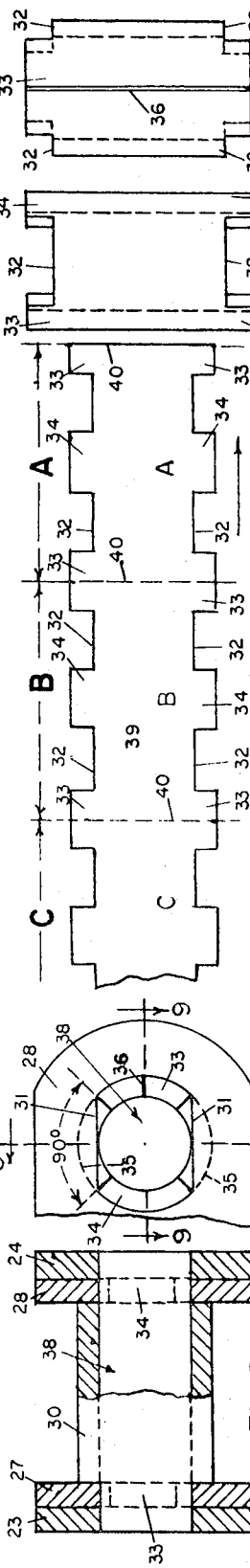
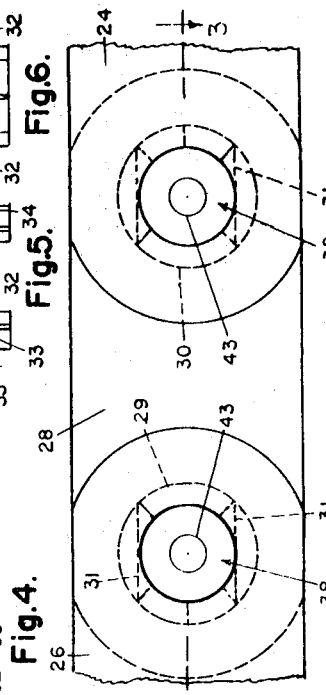
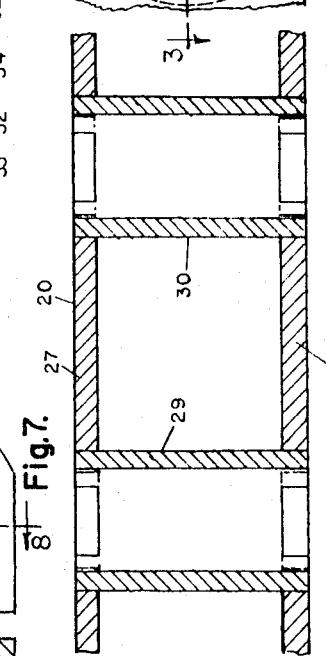
Inventor:
Robert L. Crowson,
by
Thos. A. Banning Jr. Atty

United States Patent Office 3,620,093
Patented Nov. 16, 1971

3,620,093
SQUARE LINK CHAINS, AND THE
MANUFACTURE THEREOF
Robert L. Crowson, Fulton, Ill. (% Allied Chains, Inc., Green River Industrial Park, Dixon, Ill. 61021)
Filed July 30, 1969, Ser. No. 846,114
Int. Cl. F16g 13/02
U.S. Cl. 74—250 R
8 Claims

ABSTRACT OF THE DISCLOSURE

A simplified form of roller-less square link chain including specially formed bushings connecting together the side bars of each square link. These bushings comprise sections cut from a steel strip preformed to produce alternate laterally projecting lugs with intermediate square notches, with the lugs at the two edges of the strip produced oppositely in pairs and the intervening notches also produced opposite to each other in pairs. Each such strip section includes two lugs and two notches. Each section cut off from the strip is rolled into cylindrical form to bring its ends together to form the cylinder. Such cylinder then includes a continuous cylindrical body having at each end two diametrically opposite axially extending lugs, separated by intermediate notches. Each square link side bar is provided with partially circular openings at its ends, and such side bar is seated onto the proximate end of the bushing, with the lugs extending through the side bar opening, and with the edge portion of the side bar seated against the notches thus limiting the seating operation of such side bar onto such bushing end portion, and thus retaining the two side bars at desired limited spacing from each other.

---

This invention relates to square link roller-less type chains. Specifically, the improvements herein disclosed relate to the structures of the square links and the manner in which their components are assembled and retained together under conditions of maximum strength and force transmitting ability. Specifically, an important feature of the invention relates to the provision of a novel and special form of bushing extending between the proximate ends of the side bars of the square link. A pin extends through each such bushing and is rigidly connected to the proximate ends of the connecting bars. Such bushing is so formed as to prevent the proximate side bars from being forced towards each other, and to retain the side bars at a pre-determined spacing from each other. Also, such bushing ends, and the side bar openings through which such bushing ends extend, are so formed and related to each other that the bushing is rigidly retained against rotary movement with respect to the side bars.

Both of the above stated relationships between the bushing and the side bars are produced by the special formation of the bushing ends and corresponding special formation of the side bar openings. To this purpose, each side bar opening is of circular form on two opposite arcs of size to receive endwise projecting lugs of the bushing with a close fit, and the side bar opening between such opposite arcs, is of reduced size, smaller than the diameter of the cylindrical portion of the bushing; accordingly, when the side bar is assembled onto the end portion of the bushing, the bushing lugs are accommodated into the two opposite large diameter arcuate portions of the side bar opening, but the bushing cannot rotate out of such large diameter portions; and since the smaller diameter portions of the side bar openings overlay the full diameter cylindrical portion of the bushing, the side bar cannot be shifted inwardly along the bushing beyond that point at which the surface of the side bar engages against the full diameter cylindrical end portion of the bushing.

An important feature of my present invention relates to the manner by which the special bushings are produced. To this end, a metal strip (e.g., steel), of width equal to the lateral distance between the outer ends of the bushing lugs, is preformed to produce successive laterally projecting lugs along each edge of the strip, the lugs thus preformed along the two strip edges being opposite to each other. Between such lugs there are produced successive square notches by removing the metal between the successive lugs. Such preformed strip is cut off into sections by cross-cut operations. Each section is of length along the strip equal to that length occupied by two of the lugs and two of the notches. Such length is proper to produce a bushing, when such section is rolled into cylindrical form, of the diameter proper for the square link structure, the rolling operation bringing the two ends of the cut-off section together.

A pin is extended through each of the bushings, being of length sufficient to project beyond the outer surface of the square link side bar an amount substantially equal to the thickness of the connecting bar which is provided with an opening to receive such projecting end of such pin. Each pin end is then secured to the connect bar by peening or other operation, securing the connecting bar and the pin together and against rotation between these parts. Accordingly, as the square link rides onto or from a sprocket wheel, with rotary movement between such link and the proximate connecting bars, such rotary movement must occur between the pin and the bushing. No rotation is possible between the bushing and the side bars of the corresponding square link.

It is evident that for an outside diameter of the bushing which may be acceptable into a hole of given size in the side bar of the square link, the inside diameter of such bushing made as explained above will depend on the thickness of the strip stock used for producing the bushings. Accordingly, the pin size which may be used in such bushing will also depend on such stock thickness. Accordingly, bushings of a specified outside diameter (to fit side bar openings of corresponding size), may be produced with different specified internal diameters (to receive pins of like different sizes), by selection of proper thicknesses of the stock from which the bushings are made. When the chain is under tension such tension is transmitted between each square link and the connected connecting bars by transmission directly to the projecting ends of the pins involved in the delivery of such tension. Such projecting ends are thus placed in shear and must be of size capable of transmitting such amount of shear without excessive shear force per unit section. Such so-transmitted tensional force must be transmitted between the end portion of the pin and the square link bar, at the location of the bushing and the pin. Since the pin extends out beyond the side bar of such link (for attachment to the proximate connecting bar), the opening through the side bar of the link must be large enough to pass the pin out to the connecting bar. In case the bushing should also extend outwardly through the side bar, the opening through the side bar would be large enough to pass such bushing, being much larger than the size needed for passage of the pin alone. The structures hereinbefore to be described are such that portions of the bushing do not extend through the link side bars; also such that the portions which do not extend through the side bars lie at both sides of the bushing, as distinguished from lying endwise of the side bars. Accordingly, the size of opening through the side bar needed for the structure is only that side needed to pass the diameter of the pin, not including the bushing. Accordingly, the metal removed from the side bar at each side of the pin, is limited to that amount demanded by the diameter of the pin, not that amount demanded by the diameter of the bushing. Thus there is a large saving in the metal of the side bar remaining at the location of the pin passage, and such saving is produced at each side of the pin location. The tension delivered between the square link and the proximate connecting bar at each side of the chain must be transmitted through the side bar metal remaining after producing the proximate pin delivering opening. The increase in amount of such metal which may be saved by reason of non-passage of the bushing, is very considerable, with corresponding reduction of the specific tension which must be transmitted per square inch of section. In the specific structure hereinafter illustrated, such saving is of the order of the ratio 2:1.4, an increase of approximately 43%, or a corresponding reduction of the specific load per unit section, of 28.5%, corresponding to a reduction of specific load to 71.5% of what the load would be if the opening were of size to pass the bushing. Experience shows that a large percent of failures of square link chains occur at the locations of the pins, due to reduction of the amount of metal available to carry tension at this critical location. Such failures will be greatly reduced by use of the structural features being described.

Further considering the foregoing analysis, it is evident that the shearing strength of the pin should equal the tensile strength of the metal left at both sides of such pin, in the link bar, for most economical design. In the particular structure hereinafter illustrated, wherein the cross-sectional area of the pin may be represented by 5.92 units, and the cross-sectional areas of both sides of the square link (at the location of the opening) are represented by 3.00 units, it is evident that a maximum or balanced condition as between the tensile strength of the sidebar (at the location of the opening) should be in the ratio of 5.92/3.00 per unit section. Accordingly, for the condition of a shear strength of the pin, assumed as 35,000 p.s.i., the tensile strength of the side bar should be of the order of 69,000 p.s.i. As thus compared, it will be evident that if the opening through the side bar had been large enough to accommodate the bushing (having an outside diameter of 4/2.75 times the diameter of the pin), with corresponding reduction of the amount of metal at each side of the side bar, the ratio of tensile strength of the side bar metal to shear strength of the pin, would have to be increased to 4/2.75 or 1.451 times 69,000 p.s.i., for producing a condition of balance namely, to 100,000 p.s.i., a very substantial increase, and probably requiring a much more expensive grade of steel for the side bar.

Since the internal diameter of the bushing opening depends on the thickness of the strip metal used, the diameter of the pin may be reduced by increase of metal thickness, it being understood that the size of the openings of the side bars, into which openings the lugs of the bushing extend, is unchanged to accommodate the newly chosen bushings. Such reduction of pin diameter may be effected without sacrifice of the balance between shear strength of the pin and tensile strength of the side bar at the location of the bushing. Considerable reduction of pin diameter may thus be attained since the total shear strength of the pin may be increased by use of alloy or other special metals. Such reduction of pin diameter will produce increase of metal remaining in the side bar at the two sides of the pin opening. This will result in a corresponding increase of the load transmitting ability of the link, without increase of tension per sq. in., in the metal of the side bar.

Other objects and uses of the invention will appear from a detailed description of the same, which consists in the features of construction and combinations of parts hereinafter described and claimed.

In the drawings:

FIG. 1 shows a plan view of a length of square link chain embodying the features of the present invention, one full square link being shown, together with parts of the proximate links and the connections together of the links;

FIG. 2 shows a side or face view of the proximate ends of two square links, together with the connecting bar between them;

FIG. 3 shows a plan view corresponding to FIG. 2;

FIG. 4 shows a length of preformed metal strip from which sections are cut, which sections will be rolled cylindrically to produce the bushings;

FIG. 5 shows, on enlarged scale as compared to FIG. 4, a face view of one of the bushings produced by rolling one of the sections cut off from the strip of FIG. 4; and this figure shows the notch at the near face of the bushing, together with the two bushing lugs at the sides of such notch;

FIG. 6 shows another view similar to that of FIG. 5, but with the bushing turned through ninety degrees on its axis;

FIG. 7 shows a detail face view of the end portion of one of the square links, showing the end portion of the link side bar, the opening in such side bar for accommodation of the two lugs of the bushing, and (by dotted lines) the manner in which the side bar sets against the floor of the notches between such lugs, to thus forbid shift of the side bar inwardly by engagement of the side bar with such notch floors;

FIG. 8 shows a section taken on the line 8—8 of FIG. 7, looking in the direction of the arrows; and FIG. 9 shows a section taken on the line 9—9 of FIG. 7, looking in the direction of the arrows.

Referring first to FIG. 1, the length of chain there shown includes the square link 20, together with the proximate end portions of adjacent link units 21 and 22, connected to the unit 20 by the connecting bars 23–24 and 25–26, respectively. Since all of the square link units are of the same form and identical, description of the single such unit is sufficient for purposes of this application. Such unit includes the side bars 27 and 28 which are connected together by the crosswise extending bushings 29 and 30. The manner of connecting such bushings to the side bars, comprises an important feature of the present invention.

Referring first to the showing of FIGS. 1, 2 and 3, such bushings are extended directly through the corresponding side bars which in turn are provided with openings through which the end portions of the bushings are forced during assembly. The bushings are of such size and formation that their end portions must be forced under considerable pressure into seating engagement with the side bars. Such operations require production of forces sufficient to ensure proper retention of the side bars against separation from each other, and at the intended spacing under all expected operational forces produced during expected running of the chain. The bushings are also of such form as to positively prevent shift of the link side bars towards each other, as will presently appear.

Examination of FIGS. 1 and 2 discloses the fact that the openings through the side bars are of non-circular form being, in the illustrated form, provided with the chords 31 of flattened form so that the circular form of each such opening is thus interrupted. Accordingly the crosswise extending bushing must also be provided with a corresponding non-circular portion which will register with such chord portion of the opening in the side bar. In the illustrated embodiment such chord embraces substantially ninety degrees of arc, as shown in FIG. 7. When such chord is of substantially the arcuate embracement there shown, it is possible to force the bushing into place through the side bars, resulting in a tight fit of the end portion of the bushing to conform to any irregularity of the side bar opening. After the parts have been thus assembled the side bars will be retained against displacement towards each other (with corresponding prevention of reduction of the clearance between the two side bars).

The deformities thus provided in the side bars also serve another important service as follows; when the sprocket teeth of the sprocket wheel engage such bushing during power drive, it is important to ensure against any rotation of the bushing with respect to the side bar. Such rotation is effectively prevented by the structures above described.

In FIGS. 5, 6, 7, 8 and 9 I have details of the bushing and the manner of their interlock with the side bars. In FIGS. 5 and 6 I have shown one of the bushings as viewed from two vantage points ninety degrees apart. The end portions of the bushings are provided with the recesses 32 extending inwardly from the outer ends of the bushing a distance substantially equal to the thickness of a side bar of the link unit. The production of such recesses leaves the lugs 33 and 34 projecting from the end portion of the bushing. Between such lugs 33 and 34, the floor of the recess comprises a stop surface against which the inside surface of the corresponding side bar engages when such side bar is pressed home onto the bushing during assembly. This assures accurate assembly of the square unit side bar onto such bushing and also makes it impossible for such side bar to be forced laterally towards the opposite side bar of the unit under any applied force short of a destructive force. This feature will be better understood by examination of FIG. 7. The dotted line 35 at each side of the side bar opening makes clear the engagement of the inner surface of the side bar with the floor of the recess of the bushing explained above. The illustrated recesses are of substantially ninety degrees arcuate size and corresponding width. Thus the end portion of the bushing is divided into two lugs and two intermediate recesses, each of ninety degrees arcuate value.

In FIG. 6 I have shown the bushing as split at the line 36 (being a double line the two lines of which are slightly separated indicating that the bushing, prior to assembly of the side bars thereon, is slightly expanded during manufacture, being thus biased open. Also the side bar opening is formed of size requiring slight collapse of the bushing during assembly onto the end of the bushing. Thus a very tight engagement between the parts is assured during such assembly. If desired the outer ends of the bushing lugs may be slightly bevelled to facilitate the assembling operation.

The pin 38 is extended through each of the bushings and projects beyond the outer surface of the side bar of the assembled unit. The connecting bars 25 and 26 are provided with openings to receive such projecting ends of the pins. Such engagements are of a tight fit producing the slight deformation or collapse of the cylindrical portion of the bushing, to bring its ends solidly together (again referring to FIG. 6). If desired the pin ends may be further locked to the connecting bars by peening or otherwise. Thus no rotative movement can occur between each pin and the corresponding connecting bars. Accordingly, as the chain travels over sprockets the pins will be compelled to rotate slightly within the bushings. Such rotative movements, even slight, are frequently produced under transmission of high loads. Due to the fact that each pin finds bearing against the bushing opening throughout the length of such cylindrical bushing the pressure per unit area of contact is small, with corresponding benefit.

Examination of FIGS. 7 and 8 discloses that the chords 31 of the side bar openings extend parallel to the length of the link unit and thus parallel to the direction of travel of the unit during service, being also parallel to the direction of tension produced in the chain. Since such chords thus extend in such direction, the size of the side bar opening measured across the side bar is correspondingly reduced, with corresponding increase of the metal of the side bar which transmits tension. As explained previously herein, such increase in load transmitting metal of the side bar at the location of the opening therein, is important from the standpoint of service reliability since thereby the danger of breakage of the link at the critical point is greatly reduced. In fact, as already pointed out herein, such increase in the tension load transmitting ability produced by this feature is very substantial. Experience of many years use of square link chain has shown that most failures of such chain in service occur at the locations of the openings necessarily produced in the end portions of the side bars of the links. The structural feature above discussed will greatly reduce the failures at such link locations.

I next refer to FIG. 4 as the basis of a description of a convenient and desirable manner of producing the bushings. The metal strip 39 of width equal to the overall length of the bushings to be formed (including the lugs 33 and 34) is performed to produce such lugs extending outwardly from the body of the strip. Such preforming includes removal of the metal at each edge to produce the recesses 32 between the lugs. Such preforming may be produced by conventional sheet metal operations. As the strip is advanced intermittently during such preforming operations, it is cut off at the successive lines 40 to produce the sections A, B, etc. Such cut off points may be selected at locations convenient to the shop practice, but as shown in FIG. 4 and elsewhere the cutoffs are produced centrally of every other lug, measured along a side edge of the strip. When so produced, the sections may be rolled into cylindrical form, bringing the ends of each section together to produce the desired cylindrical form. Thus treated, each bushing so produced has its strip ends brought together (with a very slight separation already referred to), and into the form shown in FIGS. 5 and 6. When such bushing is afterwards assembled into the square link, such section ends may be made to face endwise of the formed link, as evident from examination of FIG. 7 in particular. Such endwise facing of the strip ends occurs due to the fact that the recesses between the bushing lugs must lie parallel to the length of the link, as shown in FIG. 7.

After each square link has been assembled as explained above, to produce the complete square link structure, the successive square links are connected together by setting the connecting bars onto the projecting ends of the pins, as indicated in FIG. 1. In order to secure such connecting links to the connecting bars recourse may be had to such operations as peening or the like. For instance, each of the pins may be set against a stationary die 41 (FIG. 1), having a rounded or pointed end, and, while thus held in position a companion die 42, also provided with a rounded or pointed end may be driven strongly against the opposite end of the pin, thus producing the depressions 43' in the pin ends, with corresponding slight expansion of such pin ends, and crowding the pin ends strongly against the openings of the connecting bars wherein such pin ends are accommodated. The strong engagement of each connecting bar end with the corresponding pin end will ensure against rotation of the pins with respect to the connecting bars, compelling the pins to rotate within the bushings.

I claim:

1. A square link for a chain which chain comprises successive links and connecting bars extending from square link to square link; said square link comprising in combination a pair of parallel side bars spaced apart laterally to receive and accommodate teeth of a sprocket wheel; together with a hollow bushing extending across the link between proximate end portions of the side bars and spaced apart lengthwise of the link a distance to accommodate teeth of such sprocket wheel during rotation of such wheel; wherein each bushing is of a length to receive the side bars on its end portions with the side bars spaced apart laterally; each bushing being provided with a pair of diametrically opposed axially extending recesses of depth measured lengthwise of the bushing equal to the thickness of the side bar and providing between such recesses a pair of diametrically opposed lugs; each side bar being provided with an opening of size and form to match and accommodate the lugs of the bushing with such lugs spaced apart lengthwise of the side bar, and each such side bar opening being narrower at location between the lug receiving portions of the opening than the outer diameter of the bushing; whereby rotation of the bushing with respect to the side bars is forbidden, and whereby the inner surfaces of the side bars engage the floors of the bushing recesses to forbid inward shift of the side bars towards each other.

2. A square link as defined in claim 1; wherein the narrower portion of the opening in each side bar is at least as wide as the diameter of the opening through the bushing.

3. A square link as defined in claim 1; together with a pin extended through the bushing opening and through the narrow portion of each side bar; and a connecting bar in connection with the end portion of each pin outside of the proximate side bar.

4. A square link structure as defined in claim 3; wherein the connecting bar is non-rotatively connected to the pin.

5. A square link as defined in claim 1; wherein each bushing is of tubular form and of outside diameter greater then the width of the side bar opening at the narrow direction of such opening.

6. A square link as defined in claim 5; wherein each recess of the bushing comprises a discontinuity of the end portion of the tube, and wherein each of the lugs of the bushing comprises the continuous portion of the bushing end between opposite such discontinuities.

7. A square link for a chain which chain comprises successive links and connecting bars extending from square link to square link; said square link comprising in combination a pair of parallel side bars spaced apart laterally to receive and accommodate teeth of a sprocket wheel; together with a hollow bushing extending across the link between proximate end portions of the side bars and spaced apart lengthwise of the link a distance to accommodate teeth of such sprocket wheel during rotation of such wheel; wherein each bushing is of length to receive the side bars on its end portions with the side bars spaced apart laterally; each bushing being provided with a pair of diametrically opposed axially extending recesses of depth measured lengthwise of the bushing equal to the thickness of the side bar and providing between such recesses a pair of diametrically opposed lugs; each side bar being provided with an opening of size and form to match and accommodate the lugs of the bushing with such lugs spaced apart lengthwise of the side bar; wherein the bushing comprises a section of sheet metal strip of width equal to the cylindrical length of the bushing plus the combined length of a lug at each end of the bushing, which section of sheet metal strip is preformed along each of its edge portion to produce laterally extending lug elements and alternating recesses of depth equal to the axial lengths of the lugs of the bushing; wherein the section of strip is of length equal to the circular dimension of the bushing, which length includes two of the lugs and two of the recesses at each edge of the strip; and wherein such strip section is rolled into cylindrical form with the ends of the section in proximity to each other.

8. A square link as defined in claim 7; wherein the ends of the rolled section are biased apart, and wherein such end portions are brought into substantial engagement with each other when subjected to compressive force, during entry into the corresponding opening of the side bar.

References Cited

UNITED STATES PATENTS

| | | | |
|---|---|---|---|
| 2,983,158 | 5/1961 | Hodlewsky | 74—245 R |
| 3,360,095 | 12/1967 | Harding | 74—245 R X |
| 2,773,971 | 12/1956 | Teerlink | 74—245 R UX |
| 3,153,348 | 10/1964 | Kluntzmann | 74—255 S |

LEONARD H. GERIN, Primary Examiner